US012580985B2

(12) United States Patent
Carparelli

(10) Patent No.: US 12,580,985 B2
(45) Date of Patent: Mar. 17, 2026

(54) ELEVATOR SYSTEM WITH A MULTIPURPOSE EDGE-GATEWAY AND METHOD FOR DATA COMMUNICATION

(71) Applicant: Inventio AG, Hergiswil (CH)

(72) Inventor: Donato Carparelli, Lugano (CH)

(73) Assignee: INVENTIO AG, Hergiswil (CH)

(*) Notice: Subject to any disclaimer, the term of this patent is extended or adjusted under 35 U.S.C. 154(b) by 1144 days.

(21) Appl. No.: 17/595,650

(22) PCT Filed: May 26, 2020

(86) PCT No.: PCT/EP2020/064603
§ 371 (c)(1),
(2) Date: Nov. 22, 2021

(87) PCT Pub. No.: WO2020/239782
PCT Pub. Date: Dec. 3, 2020

(65) Prior Publication Data
US 2022/0219942 A1     Jul. 14, 2022

(30) Foreign Application Priority Data

May 29, 2019     (EP) ..................................... 19177240

(51) Int. Cl.
*H04L 67/12*          (2022.01)
*B66B 5/00*           (2006.01)
(52) U.S. Cl.
CPC ............ *H04L 67/12* (2013.01); *B66B 5/0031* (2013.01); *B66B 5/0037* (2013.01); *B66B 5/0087* (2013.01)
(58) Field of Classification Search
CPC ....... H04L 67/12; B66B 5/0031; B66B 5/037; B66B 5/087

(Continued)

(56) References Cited

U.S. PATENT DOCUMENTS 8,230,977 B2 *   7/2012   Thumm ................ B66B 5/0031
                                                          187/249
10,981,750 B2 *   4/2021   Song ..................... B66B 5/0025

(Continued)

FOREIGN PATENT DOCUMENTS

CN          102891796 A          1/2013
CN          104355196 A          2/2015

(Continued)

OTHER PUBLICATIONS

Min et al., Design and implementation of the multi-channel RS485 IOT gateway, May 27, 2012, IEEE International Conference on Cyber Technology in Automation, Control and Intelligent Systems (Year: 2012).*

(Continued)

*Primary Examiner* — Christina M Schreiber
(74) *Attorney, Agent, or Firm* — Shumaker, Loop & Kendrick, LLP

(57)          ABSTRACT

An elevator system includes at least one autonomous unit for controlling an elevator and a multichannel-edge-gateway that builds communication between the autonomous unit and data resources on an IoT network. The multichannel-edge-gateway has more than one communication channel), wherein these communication channels provide data communicating using the same protocol or different protocols either synchronously or asynchronously. The multichannel-edge-gateway includes a channel assignment that automatically matches one of the communication channels to one of the protocols according to data to be sent from the multichannel-edge-gateway.

13 Claims, 1 Drawing Sheet

4 ELEVATOR CONTROL DEVICE
5 SAFETY CHAIN
6 SENSOR DEVICES
7 MULTICHANNEL-EDGE-GATEWAY
8 EXTERNAL CLOUD-BASED DATA
   RESOURCE, ONLINE SERVERS,
   DEVICES OF IOT NETWORK
9 CHANNEL ASSIGNMENT
10 CHANNELS
11 PERIPHERAL AND MOBILE
   DEVICES

(58) Field of Classification Search
USPC ......................................................... 187/391
See application file for complete search history.

(56) References Cited

U.S. PATENT DOCUMENTS

| | | | | |
|---|---|---|---|---|
| 11,702,316 | B2 * | 7/2023 | Witczak | G01C 21/20 |
| | | | | 187/391 |
| 11,780,704 | B2 * | 10/2023 | Copeland | B66B 5/0025 |
| | | | | 187/391 |
| 12,301,411 | B2 * | 5/2025 | Gunturu | H04L 41/0803 |
| 2008/0026747 | A1 * | 1/2008 | Navarro | H04W 16/12 |
| | | | | 455/426.1 |
| 2010/0148940 | A1 * | 6/2010 | Gelvin | H01Q 9/0464 |
| | | | | 340/286.02 |
| 2018/0346284 | A1 * | 12/2018 | Swami | B66B 5/027 |
| 2022/0033217 | A1 * | 2/2022 | Roberts | B66B 5/0031 |
| 2022/0219942 | A1 * | 7/2022 | Carparelli | B66B 5/0037 |

FOREIGN PATENT DOCUMENTS

| | | | | |
|---|---|---|---|---|
| CN | 106006248 | A | 10/2016 | |
| CN | 205652941 | U | 10/2016 | |
| CN | 106348113 | A | 1/2017 | |
| CN | 106549863 | A | 3/2017 | |
| CN | 206461640 | U | 9/2017 | |
| EP | 1193209 | A1 * | 4/2002 | ............... B66B 1/34 |
| EP | 3392191 | A1 * | 10/2018 | ........... B66B 1/3423 |
| ES | 2714506 | T3 * | 5/2019 | ........... H04W 72/54 |
| KR | 20160068626 | A | 6/2016 | |

OTHER PUBLICATIONS

Dong Min, et al: "Design and Implementation of the multi-channel RS4B5 I0T gateway", Proceedings of the 2012 IEEE International Conference on Cyber Technology in Automation, Control and Intelligent Systems, May 27-31, 2012, pp. 366-370, IEEE, Bangkok, Thailand.

Ke Yuyi et al., Research on the application of cutting-edge Internet of Things technologies in intelligent transportation, Industrial Science and Technology Innovation No. 10, Apr. 5, 2019, China.

* cited by examiner

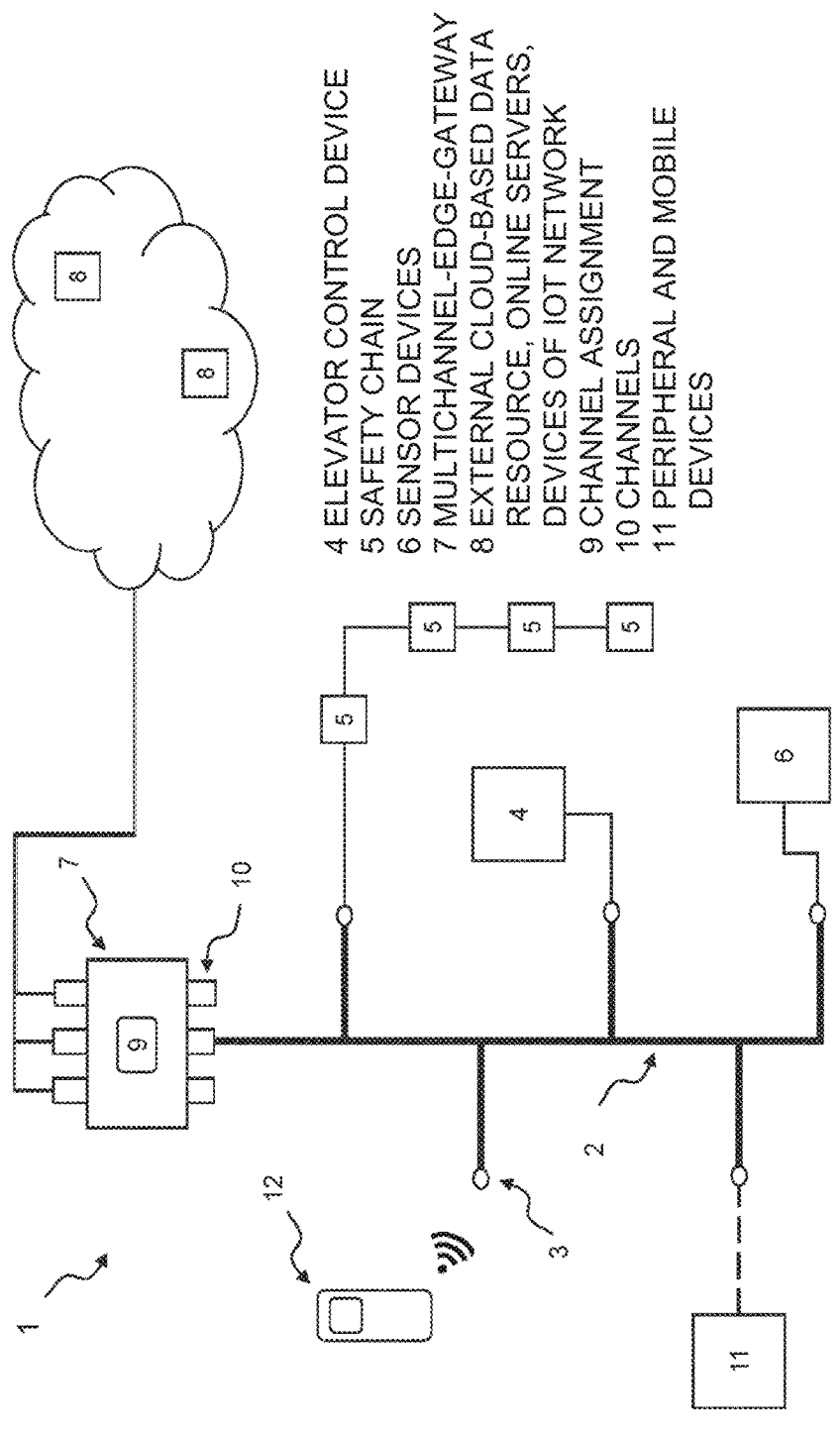
4 ELEVATOR CONTROL DEVICE
5 SAFETY CHAIN
6 SENSOR DEVICES
7 MULTICHANNEL-EDGE-GATEWAY
8 EXTERNAL CLOUD-BASED DATA
  RESOURCE, ONLINE SERVERS,
  DEVICES OF IOT NETWORK
9 CHANNEL ASSIGNMENT
10 CHANNELS
11 PERIPHERAL AND MOBILE
   DEVICES

ELEVATOR SYSTEM WITH A MULTIPURPOSE EDGE-GATEWAY AND METHOD FOR DATA COMMUNICATION

FIELD

The present invention relates to an elevator system comprising an edge-gateway within a building ecosystem including different functional devices and a method for data communication with such an elevator system.

BACKGROUND

Internet of things (IoT) networks are attracting a huge amount of attention these days so that many elevators are developed for communicating via IoT technology. An IoT is a whole system of physical objects that are connected to the internet and are capable of transmitting data over whole networks without requiring human intervention to do so. For smart buildings, the IoT is the foundation, wherein the IoT encompasses everything connected to the internet. For a building to be smarter or more economical, the building is required to provide data communication between all available hardware and software systems as much as possible and quickly. An elevator system which serves for controlling and operating an elevator hence becomes more and more complicated, because a lot of components, devices, and units—often highly domain specific—are installed for various purposes within this elevator system as well devices, e.g. delivery Robots, alarm systems, access systems and/or any other smart device parts of the building ecosystem. At the same time, more and more other peripheral and mobile devices are used for elevators in order to meet increasingly complex functions. On the other hand, there are many different types of communication protocols available, each of them has own technical characters for signal transmission and in most of the cases need to connect to the Cloud. Therefore, there is a fundamental challenge in connecting the different components in a building ecosystem for data communication.

Moreover, another newest technology trend is machine learning and it will play with big data based on cloud technology to provide immense advantages in the future. As a result, the volume of data grows so that big data grows bigger. These data are delivered through IoT or cloud networks to help businesses not only reacting to problems as they occurred, but also predicting them and fixing them beforehand. But for industrial applications, the unique challenge of IoT is the high volume of real-time data from a variety of data sources and in managing and leveraging such data.

A gateway normally communicates using more than one protocol and can operate at any of the seven layers of the open systems interconnection model (OSI). Although such a gateway serves as a translator between different protocols, e.g. between IEEE 802.15.4 or IEEE 802.11, and enables data transmission such as wired or wireless communication from one discrete network to another one, but it is still difficult to meet all demands for massive data volume exchanging and transmitting. As improved gateways, an edge-gateway (EGW) provides a network with connectivity to external networks and can make IoT networks work more efficiently and that adapt to individual use cases. An edge device may provide authenticated access to faster, more efficient networks.

EP 3 392 191 A1 discloses an elevator controller which may communicate with a smart gateway and a cloud server to support some control functions.

SUMMARY

It is therefore an object of the present invention to improve the data communication of an elevator with external cloud-based data sources on an IoT-network, especially with other building appliances, to ensure a seamless data transmitting from or to the elevator, in order to make a smart building ecosystem interacting with this elevator work more smoothly and efficiently.

This object is solved by subject-matter according to the technically beneficial embodiments that are the subject of the description, and the drawings.

According to a first aspect, this object is solved by an elevator system comprising at least one autonomous unit for controlling an elevator. An autonomous unit is based on at least one rule, the application of such an autonomous unit yields a change of the elevator. These autonomous units typically act autonomously, but they may also communicate and interact with each other. The elevator system comprises further a multichannel-edge-gateway which is capable of building a communication between the autonomous unit and data resources on an IoT network. The multichannel-edge-gateway comprises more than one communication channel, wherein these channels are capable of data communicating using the same protocol or different protocols either synchronously or asynchronously. The multichannel-edge-gateway comprises further a channel assignment which is capable of matching automatically one of the channels to one of the protocols according to data to be sent from the multichannel-edge-gateway.

This yields a technical advantage that a communication between the elevator system and the external environment, e.g. mobile devices or IoT-network can be easily and reliably created when one or more channels are currently busy. Even if the format of the data from the elevator system is not suitable for a currently used communication protocol or a current free channel, the multichannel-edge-gateway will switch automatically to another free channel using a suitable protocol. By using this multichannel-edge-gateway, data can be transmitted through different channels simultaneously or successively. Hence, it may increase communication throughput, provide robustness against interference, and optimize the communication capacity of the elevator system. If an elevator has to be connected to a remote surveillance center, with an elevator system afore-described it will fulfill EN81 28 norms. This enables e.g. an elevator in a smart building not only interacting with building operators and occupants, but also with remote center or various user terminals to provide a new level of insight and relationships.

Like normal gateways, the multichannel-edge-gateway can provide the functionality to support authentication, authorization, security, audit, and regulatory compliance too. Other than that, the multichannel-edge-gateway comprises a channel assignment which is capable of automatically and/or optimally matching one of the channels and one of the protocols to each other according to the data to be sent from the multichannel-edge-gateway. Due to cost reasons, the channels may have different technical characters like speed, bandwidth, safety and interference and signal attenuation, as well as the communication protocols, are used for different purposes. Thus, the channel and the protocol which are to be used must match each other at the best so that the communication of the elevator system will be optimized.

In a further technically advantageous embodiment of the elevator system, the channel assignment is capable of assigning one of the channels and one of the protocols according to a priority being assigned to the data being sent to the multichannel-edge-gateway. This means that the process of data transmission can be interrupted if other data coming to the multichannel-edge-gateway has a higher priority and is thus more important than the currently transmitted data. In this case, the occupied channel will be set free and available for transmitting the other data at first. A further technical advantage achieved is that the communication reliability and immediacy of the elevator system is increased.

In a further technically advantageous embodiment of the elevator system, the optimal matching and/or assigning the channels and the protocols are executable by self-learning and/or manual configuring the multichannel-edge-gateway according to the data content, data format and/or the data source. The channels can be different from each other in their technical characters like data-transfer speed, band-width, safety and interference and signal attenuation. The so-called self-learning means that the gateway receives initial instructions, but after that, it learns on its own based on the data feeding it. The self-learning may learn from a matching result, statistical data or failure diagnosis etc. This yields also a technical advantage that the data can always be transmitted through the best possible channel using the best suitable protocol. There is no need to configure communication paths because the multichannel-edge-gateway manages the paths automatically. This feature ensures that the elevator system have the most reliable path to send data.

In a further technically advantageous embodiment of the elevator system, the autonomous unit is a component of the elevator system like an elevator control device, a safety chain or a sensor device, wherein the safety chain is the total of the electric safety devices of the elevator system connected in series. And the elevator system may comprise a fieldbus system with at least one access point. The autonomous unit then is capable of connecting via wire and/or wirelessly with the fieldbus system through this access point. The access point is capable of connecting with a peripheral device and/or a mobile device. The multichannel-edge-gateway can communicate with the fieldbus system to bridge a gap between information technology and operations technology. Then low-level control devices such as switches, programmable logic controllers (PLCs), sensors and remote I/O which communicate with each other normally only through the fieldbus now can communicate directly also with other devices which are not parts of the elevator system. This not only realizes a real-time communication for the elevator system with external devices but also simplifies the integration of the elevator system in an elevator environment and brings it closer to the end-users without the need to require the customer to install any mobile application. This means that the multichannel-edge-gateway may have all relevant data for analysis and processing to optimize overall in building mobility, energy consumption, traffic flow, security and many others.

On the basis of the fieldbus system, it is also possible to connect the autonomous unit with other devices (e.g. smart phones or delivery robots) to build a bus network based on a LAN (local area communications Network) technology. A so-called bus network is a LAN topology in which all the nodes in the LAN-network—e.g. server, workstations and peripheral devices—are connected to a shared fieldbus system. The LAN e.g. is based on the popular IEEE802.3 set of standards (Ethernet). Since the control system network infrastructure is usually available throughout the building where the elevator is installed, it sometimes worth attempting to combine the control system of the LAN with the fieldbus system.

In a further technically advantageous embodiment of the elevator system, the multichannel-edge-gateway is capable of encrypting and/or formatting data before the data are sent away from the multichannel-edge-gateway. This means that data sent to the gateway won't need to be transmitted directly to the elevator system. The gateway will evaluate the safety of this data, e.g. risks of cyberattack or data loss. If the safety should be improved, the gateway can encrypt the data with a certificate or a key at first. Formatting the data in a safe format is another precaution method before data transmission. Thus, the multichannel-edge-gateway is able not only to manage the transfer of data, but also to process data. Such a data protection measure may be executable by self-learning and/or manual configuring the multichannel-edge-gateway too.

According to a second aspect this object is solved by a method for data communication between an elevator system and cloud-based data resources on an IoT network. The elevator system comprises at least one autonomous unit for controlling an elevator and a multichannel-edge-gateway. A data communication between the autonomous unit and cloud-based data resources is built by the multichannel-edge-gateway. The multichannel-edge-gateway administers more than one communication channel using the same protocol or different protocols either synchronously or asynchronously. And the multichannel-edge-gateway matches automatically and/or optimally one of the channels to one of the protocols according to the data to be sent from the multichannel-edge-gateway.

At least one of the afore-mentioned implementation examples offers one or more solutions to the problems and disadvantages of the known prior art. Other technological benefits of the present invention become evident to a person skilled in the art from the following description and the claims. The numerous examples of implementing the present invention achieve only a part of the presented advantages. None of the advantages is critical to the examples of implementation. Any required embodiment can technically be combined with any other required embodiment. The examples represent only a few advantageous embodiments and they do not limit the idea of the invention that can be implemented even in other manners within the framework of the claims presented further below.

DESCRIPTION OF THE DRAWINGS

Below embodiments of the present invention are described in more detail with reference to the attached drawings. The accompanying drawings, which are included to provide a further understanding of the invention and constitute a part of this specification, illustrate embodiments of the invention and together with the description help to explain the principles of the invention. In the drawings:

FIG. 1 shows a schematic diagram of an elevator system according to the aforementioned invention.

DETAILED DESCRIPTION

FIG. 1 is a schematic diagram of an elevator system 1 in a smart building ecosystem (not displayed). This elevator system 1 is capable of communicating with an external cloud-based data resource 8 like online servers or devices of an IoT-network. The communication between the elevator system 1 and the cloud-based data resource 8 is possible using different wired or wireless communication protocols, e.g. Ethernet, telephone landline network such as Digital Subscriber Line (DSL) or cellular networks such as 2G like GSM/GPRS, 3G like UMTS, 4G like LTE/WiMax or 5G. The elevator system 1 e.g. serves for controlling an elevator car (not displayed) that vertically moves between floors, levels or decks. This elevator system 1 comprises a fieldbus system 2 (e.g. RS485 or RS232 bus) with more access points 3. These access points 3 are different I/O-interfaces such as wired or Bluetooth etc.

The elevator system 1 comprises more autonomous units for controlling the elevator (not displayed). These autonomous units are e.g. an elevator control device 4, a safety chain 5 and sensor devices 6 which can communicate with each other e.g. through the fieldbus 2, when they are connected at the access points 3 respectively via wire and wirelessly. In practice, the safety chain 5 itself sometimes can be realized by a fieldbus system 2 too. In this case, the safety chain 5 is to integrate into the fieldbus system 2. Moreover, one or more peripheral devices and mobile devices 11 which are not the components of the elevator system 1, but could be control units of the building ecosystem, are connected to the fieldbus system 2 too, e.g. through the access points 3. By this way, the low-level control devices like switches, contacts and sensors may also communicate directly with cloud-based data resources 8, if it is necessary. Furthermore, it is also possible to connect other devices 12 (e.g. smart phones or delivery robots) with the fieldbus system 2 e.g. based on a LAN-network (e.g. bus network).

A multichannel-edge-gateway 7 of the elevator system 1 is used to act a bridge or translator for communication between the external data resources 8 in the cloud and the fieldbus system 2. The multichannel-edge-gateway 7 comprises a multiple of channels 10 which are capable of data communicating using the same protocol or different protocols. These channels 10 are different from each other in their technical characters like data-transfer speed, bandwidth, safety and interference etc. The communications through these channels 10 are mutually independent so that they can be executed synchronously or asynchronously. The multichannel-edge-gateway 7 comprises a channel assignment 9 to match a channel 10 with a possible communication protocol automatically and/or optimally according to the data to be sent from the multichannel-edge-gateway 7. For selecting the channel 10 it is to consider the technical characters of the channels 10, e.g. data-transfer speed, bandwidth, safety and interference and signal attenuation, etc.

Additionally, one of the channels 10 and the protocols can be assigned or selected according to the priority of the data being sent from the multichannel-edge-gateway 7. The optimal assigning and matching the channels and the protocols can be executed e.g. according to the data content, data format and/or the data source. For instance, even though all channels 10 are currently busy, but now an alarm signal for an emergency case is sent from the safety chain 5. The gateway 7 should interrupt at least one of the channels 10 and set this channel immediately available for sending this alarm signal. After then, the interrupted prior communication will be continued.

All features discussed in the description or shown in the figures with respect to particular embodiments of the invention can be provided in various combinations in order to simultaneously realize the beneficial technical effects.

All method steps can be implemented by means that are adapted for carrying out the corresponding method step. All functions carried out by a specific structural feature can be a method step of a method.

It is obvious to a person skilled in the art that with the advancement of technology, the basic idea of the invention may be implemented in various ways. The invention and its embodiments are thus not limited to the examples described above; instead they may vary within the legal scope of protection of the present invention defined by the claims.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:
   an autonomous unit for controlling an elevator of the elevator system; and
   a multichannel-edge-gateway for data communication between the autonomous unit and data resources on an IoT network;
   wherein the multichannel-edge-gateway includes at least two communication channels configured for the data communication using a same protocol or different protocols and communicating either synchronously or asynchronously;
   wherein the multichannel-edge-gateway includes a channel assignment configured to automatically match one of the at least two communication channels to one of the protocols according to data to be sent from the multichannel-edge-gateway and configured to subsequently assign the matched communication channel to communicate the data to be sent to the data resources on the IoT network; and
   wherein a matching and/or an assigning by the channel assignment are executable by self-learning according to a data content, a data format, data priority, and/or a data source.

2. The elevator system according to claim 1 wherein the channel assignment assigns the matched communication channel to communicate according to a priority of data being sent to the multichannel-edge-gateway.

3. The elevator system according to claim 1 wherein the at least two communication channels differ from each other in at least one of technical characters including data-transfer speed, bandwidth, safety and interference and signal attenuation.

4. The elevator system according to claim 1 wherein the autonomous unit is a component of the elevator system selected from the group comprising an elevator control device, a safety chain, or a sensor device; and wherein when the autonomous unit is the safety chain, the safety chain comprises electric safety devices of the elevator system connected in series.

5. The elevator system according to claim 1 further comprising:
   a fieldbus system having at least two access points;
   wherein the autonomous unit is connected to the fieldbus system through one of the at least two access points by at least one of a wired connection and a wireless connection;
   wherein another of the at least two access points is configured to connect with at least one of a peripheral device and a mobile device; and wherein the multichannel-edge-gateway communicates with the autonomous unit through the fieldbus system.

6. The elevator system according to claim 1 wherein the multichannel-edge-gateway at least one of encrypts and formats the data to be sent before the data to be sent are sent from the multichannel-edge-gateway.

7. A method for data communication between an elevator system and cloud-based data resources on an IoT network, wherein the elevator system includes an autonomous unit for controlling an elevator and includes a multichannel-edge-gateway, the method comprising the steps of:

establishing a data communication between the autonomous unit and the cloud-based data resources with the multichannel-edge-gateway;

administering at least two communication channels with the multichannel-edge-gateway using a same protocol or different protocols and communicating either synchronously or asynchronously; and the multichannel-edge-gateway matching automatically one of the at least two communication channels to one of the protocols according to data to be sent from the multichannel-edge-gateway to the cloud-based data resources on the IoT network; wherein the channel assignment self-learns to match automatically the one of at least two communication channels to the protocols and subsequently assign the matched one of the at least two communication channels according to a data content, a data format, data priority, and/or a data source.

8. The method according to claim 7 wherein the multichannel-edge-gateway assigns one of the at least two communication channels according to a priority of data being sent to the multichannel-edge-gateway.

9. The method according to claim 7 wherein the at least two communication channels differ from each other in at least one of technical characters including data-transfer speed, bandwidth, safety and interference and signal attenuation.

10. The method according to claim 7 wherein the autonomous unit is a component of the elevator system selected from the group comprising an elevator control device, a safety chain, or a sensor device; and wherein when the autonomous unit is the safety chain, the safety chain comprises electric safety devices of the elevator system connected in series.

11. The method according to claim 7 including connecting at least one of a peripheral device and a mobile device either by wire or wirelessly with the elevator system.

12. The method according to claim 7 including: connecting the autonomous unit by wire or wirelessly with a fieldbus system of the elevator system through an access point of the fieldbus system; connecting at least one of a peripheral device and a mobile device for communication with the fieldbus system through another access point of the fieldbus system; and operating the multichannel-edge-gateway to communicate with at least one of the autonomous unit, the peripheral device and the mobile device by the fieldbus system.

13. The method according to claim 7 wherein the multichannel-edge-gateway at least one of encrypts and formats the data to be sent before the data to be sent are sent from the multichannel-edge-gateway.

\* \* \* \* \*